Dec. 14, 1954  D. McD. LAMB  2,696,825
PORTABLE VEHICLE SHELTER
Filed Dec. 6, 1951  2 Sheets-Sheet 1

INVENTOR.
Daniel McDonald Lamb
BY
ATTY.

Dec. 14, 1954   D. McD. LAMB   2,696,825
PORTABLE VEHICLE SHELTER
Filed Dec. 6, 1951   2 Sheets-Sheet 2
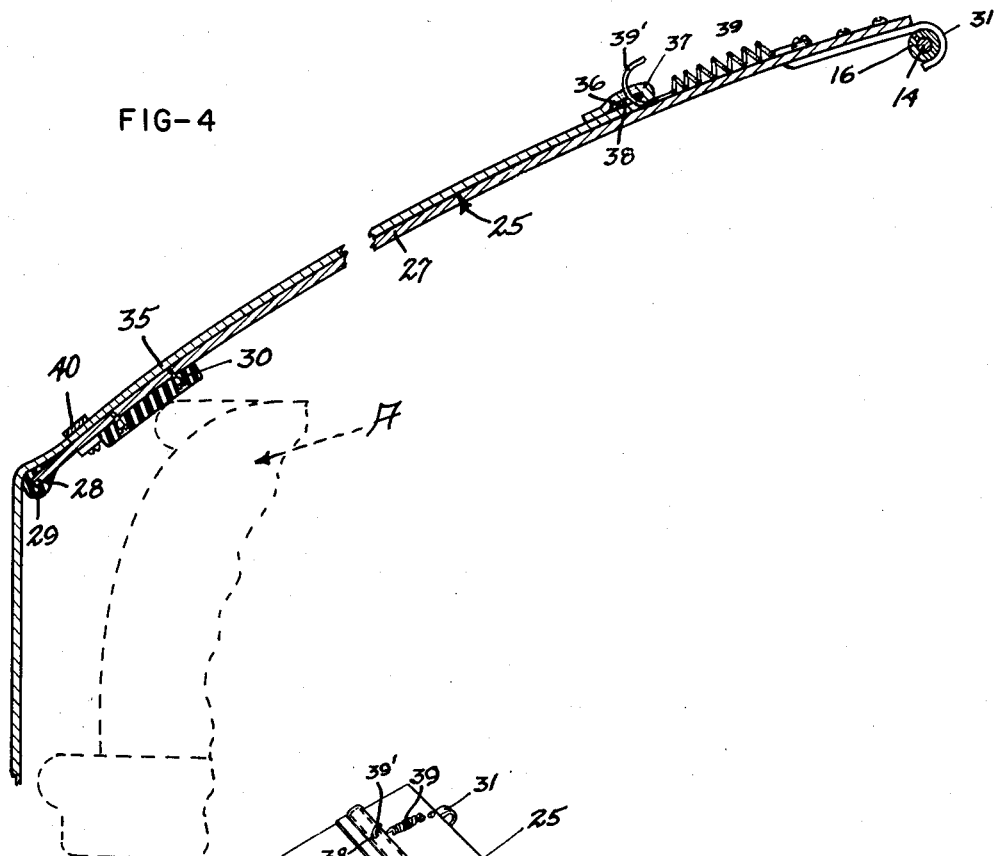
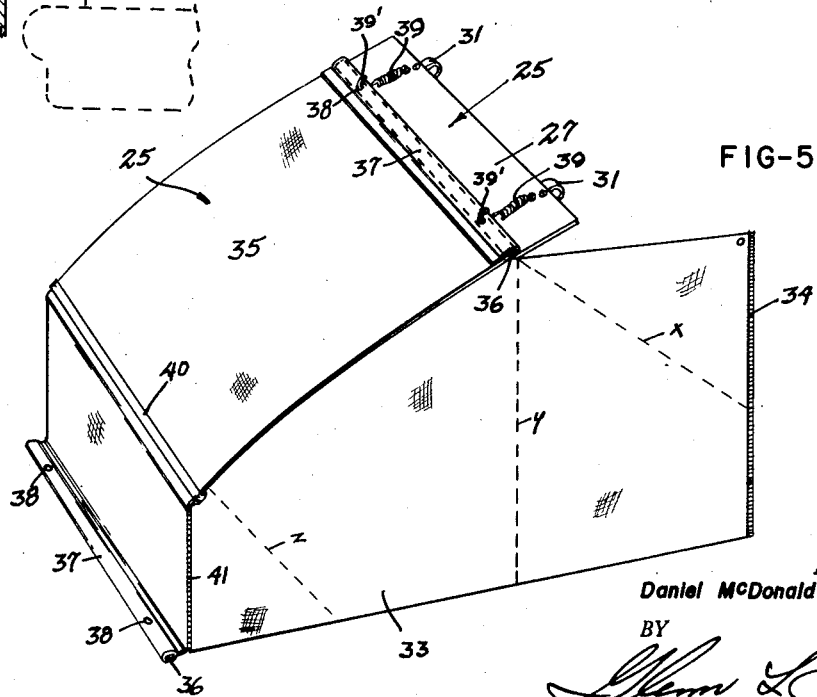
INVENTOR.
Daniel McDonald Lamb
BY
ATTY.

United States Patent Office 2,696,825
Patented Dec. 14, 1954

2,696,825

PORTABLE VEHICLE SHELTER

Daniel McDonald Lamb, Spokane, Wash.

Application December 6, 1951, Serial No. 260,243

2 Claims. (Cl. 135—1)

This invention is a portable shelter for automotive vehicles, and one object of the invention lies in the provision of a vehicle carried shelter which is adapted to have pallets shiftable forwardly and rearwardly in covering relation to the vehicle, and skirts on the pallets adapted to be folded thereon or unfolded to cover the vehicle.

Another object of the invention lies in the provision of a protective cover for the portable shelter when in the stored position and which also functions as a shield or visor for the windshield and rear window of the vehicle.

Another object of the invention lies in the provision of a portable vehicle shelter which is supplied with two pallets, one shiftable forwardly and one shiftable rearwardly, to cover the front and rear portions of the vehicle while the protective cover covers the top of the vehicle. Each pallet carries a portion of the skirt which may be unfolded and fastened about the vehicle to form a complete enclosure therefor.

Another object of the invention lies in the provision of a frame which carries the pallets and protective cover from the roof of the vehicle.

These and other objects and advantages of the invention will become apparent during the course of the following description.

Figure 1:
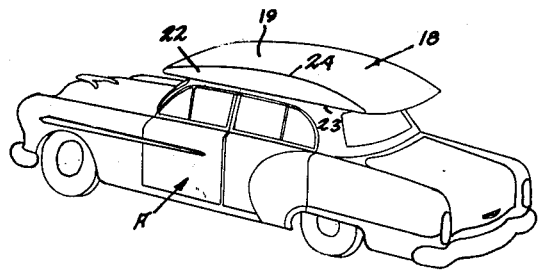
Figure 2:
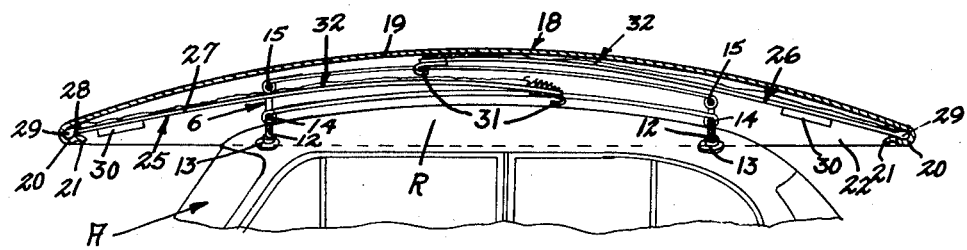
Figure 3:
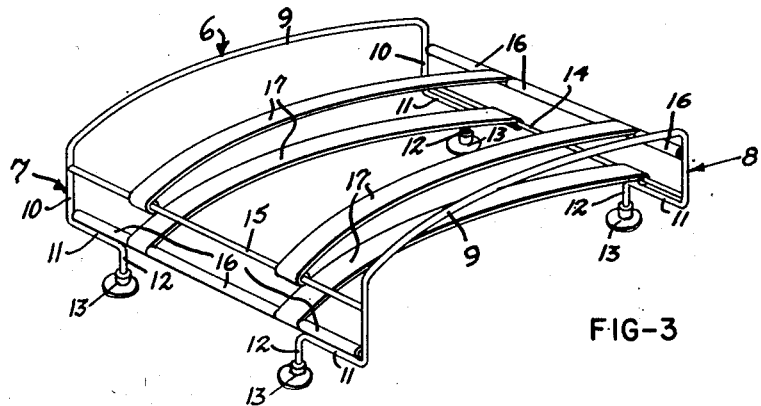

In the accompanying drawings, forming a part of this specification, and in which like numerals are employed to designate like parts, Figure 1 is a perspective view of a vehicle having my invention applied and in the stored position, Figure 2 is a longitudinal cross section taken through the invention mounted on a vehicle roof, Figure 3 is a perspective view of the supporting frame for the device, Figure 4 is an enlarged fragmentary longitudinal cross section of one pallet in the covering or extended position, and Figure 5 is a perspective view of one pallet in the extended position and with its skirt section in the enclosing position.

Referring now more particularly to the drawings, I have shown a vehicle A adapted with my invention which comprises a supporting frame 6 having front and rear end sections 7 and 8 united by longitudinally extending, upwardly bowed tie braces 9 which are continuations of the upwardly extending vertical side bars 10 of each section 7 and 8.

From their respective lower end, each side bar 10 has an arm 11 which extends transversely of the frame inwardly and terminates in a depending supporting leg 12. Rubber feet 13 or vacuum cups are provided on the end of the legs and disposed to rest upon the top or roof R of the vehicle A.

Spaced above the arms 11 and secured between the side bars 10, each end section has a transverse rod 14 and further spaced upwardly a second transverse rod 15. The rod 14 at the forward end of frame 6 and rod 15 at the rear end thereof are each provided with segmental rollers 16 on their respective rod 14 or 15. A longitudinally extending pair of carrying bars 17 extend between the two bars 15 and have their end portions wrapped thereabout and are disposed between the segments of rollers 16 to transversely position the bars 17. A second pair of carrying bars 17 are likewise secured between bars 14. These carrying bars are bowed upwardly to conform to the configuration of the vehicle roof R.

Suitable straps and hooks which are well known for securing carriers on the top of a vehicle are used to secure the frame thereon, but are not shown as they are not a part of my invention.

A protective cover 18 is secured to the frame in any desired way such as by welding or bolting, and the cover comprises a bowed top 19 which terminates at each longitudinal end with a downwardly rolled lip 20 forming a transversely extending slot adapted to receive and yieldably or releasably secure the edge of a pallet. A reverse bend tongue 21 is supplied on the lip to guide a pallet into the slot. Side walls 22 have a straight lower edge 23 and the arcuate upper edges 24 converge towards the ends of the cover 18.

Examination of Figure 2 will reveal that the frame 6 slidably carries lower and upper pallets 25 and 26. The lower pallet 25 is slidable into and out of frame 6 forwardly and upper pallet 26 slides into and out of the frame rearwardly. Since both pallets are identical in construction, the front pallet 25 only will be described. This pallet comprises a rectangular sheet 27 bowed longitudinally and which is sufficiently resilient to permit a limited amount of flexing. The forward edge 28 of the pallet sheet 27 is arcuate transversely to coincide with the edge of the cover top 19. A bead 29 of rubber or other similar material is secured to said forward edge 28 and is adapted to be forced into the rolled lip 20 of the top 19 to releasably anchor the pallet against accidental shifting, while the bulk of the pallet rests in frame 6 on bars 17.

A resilient cushion 30 is secured to the under side of the pallet and is disposed to rest upon the vehicle and support the pallet when in the extended position, without marring the finish of the vehicle. However, it doubles for a hand hold to permit one to shift the pallet into and out of engagement with lip 20.

When pallet 25 or 26 is moved to the extended position, it is first extracted from lip 20 and lowered to rollers 16, thence it is pulled out over bars 17 and rollers 16. Hooks 31 are secured to the rear edge portion of the pallet and engage about rollers 16 to prevent the pallet from being pulled completely out of the frame.

Folded on top of the pallets 25 and 26 are fabric, or other material coverings 32, which when unfolded, comprise side portions 33 which extend toward the longitudinal center of the vehicle and have fasteners such as zippers 34 to secure the two together covering the sides of the vehicle. A second portion, we shall term a fly, 35 has transversely extending bars 36 in casings 37 one at each end of the fly. Spaced holes 38 are formed in the bars and casings and receive hooks 39' of resilient means such as springs 39 secured at one end to the pallet. These springs permit yielding of the fly 35 longitudinally. At the forward or outer free end of the pallet, the fly passes loosely under a strap 40 which extends transversely across the top of the pallet. Spaced from the free end of the fly 35, on its side edges, are zippers 41 which cooperate with corresponding zippers on the forward edge of side portions 33 and thus when united form a complete cover or enclosure for the vehicle.

When removing the shelter for travel, the fasteners 34 and 41 are released; the side portions are folded as indicated in Figure 5 by bringing the corner portion outwardly and down along line x, thence folding the doubled portion over the central portion along line y, thence folding the lower front corner up over these portions along line z and finally laying the folded side portion over the fly 35 on the pallet. When both side portions 33 are placed on the pallet, the free end portion of fly 35 is folded rearwardly over the pallet and the free end hooked on the hooks 39' of springs 39. This maintains the covering material under tension where it is not liable to shift about. The pallets are then shifted to the retracted position and the edge beads 29 pressed into lips 20.

Having thus described my invention, I claim:

1. A portable vehicle shelter comprising in combination a frame having vertically disposed end sections, transversely extending vertically spaced rods in each section, inwardly spaced supporting feet on the sections, longitudinally extending carrying bars secured between rods on the same horizontal plane in said sections, rollers on selected ones of said rods, a cover carried by the frame and having downwardly rolled lips at its forward and rear ends, pallets having vehicle enclosing skirts secured and folded thereon, said pallets supported by said frame and movable longitudinally on said carrying bars and rollers to retracted and extended positions, and beads on the outer edges of said pallets and adapted to be releasably held by said lips when in the retracted position.

2. A portable vehicle shelter comprising a supporting frame and a cover therefor, inflexible pallets carried by the frame and shiftable longitudinally to extended and retracted positions, skirts on the pallets and having side portions and flies adapted to form an enclosure for a vehicle, tension spring mounted hooks carried by the pallets along their inner edges and yieldably securing said flies at their inner ends; rigid straps having their ends secured at the side edges of the pallets and extending transversely thereof at their outer ends, and said flies being longitudinally slidable thereunder, whereby each of the flies may be folded back upon itself about one of said straps and have its free end releasably secured to said hooks and thereby maintain the flies longitudinally taut for storage.

References Cited in the file of this patent

UNITED STATES PATENTS

| Number | Name | Date |
|---|---|---|
| 1,659,825 | MacKay | Feb. 21, 1928 |
| 1,999,171 | Bryant | Apr. 30, 1935 |
| 2,469,987 | Pilsner | May 10, 1949 |
| 2,496,085 | Engelheart | Jan. 31, 1950 |
| 2,635,615 | Rice | Apr. 21, 1953 |

FOREIGN PATENTS

| Number | Country | Date |
|---|---|---|
| 798,110 | France | Mar. 2, 1936 |